United States Patent [19]

Laude

[11] Patent Number: 4,651,315
[45] Date of Patent: Mar. 17, 1987

[54] OPTICAL ISOLATION DEVICE FOR MULTIPLEXING OR DEMULTIPLEXING WAVELENGTHS

[75] Inventor: Jean-Pierre Laude, Saclas, France
[73] Assignee: Instrument S.A. of France, Paris, France
[21] Appl. No.: 514,390
[22] Filed: Jul. 15, 1983

Related U.S. Application Data

[63] Continuation-in-part of Ser. No. 514,386, Jul. 15, 1983.

[30] Foreign Application Priority Data

Jul. 16, 1982 [FR] France ............................ 82 12438

[51] Int. Cl.⁴ .................................................. H04B 9/00
[52] U.S. Cl. ...................................... 370/3; 350/96.18
[58] Field of Search ................ 370/1, 3; 350/96.15, 350/96.16, 96.18, 96.19

[56] References Cited

U.S. PATENT DOCUMENTS

| 4,244,045 | 1/1981 | Nosu et al. | 370/3 |
| 4,441,784 | 4/1984 | Korth | 350/96.15 |
| 4,474,424 | 10/1984 | Wagner | 370/3 |
| 4,479,697 | 10/1984 | Kapany et al. | 350/96.19 |

FOREIGN PATENT DOCUMENTS

| 54-21747 | 2/1979 | Japan | 350/96.18 |
| 56-155901 | 12/1981 | Japan | 350/96.19 |
| 56-167103 | 12/1981 | Japan | 350/96.16 |

OTHER PUBLICATIONS

Tanaka et al.,-Optical-Multi/Demultiplexer—Nat. Tech. Report vol. 27, No. 5, Oct. 1981 pp. 735-743.

*Primary Examiner*—Joseph A. Orsino, Jr.
*Attorney, Agent, or Firm*—Handal & Morofsky

[57] ABSTRACT

Optical isolation device intended to be used at one end of an optical transmission fiber (1) to introduce therein a light from a nearby emitter and to extract therefrom and to separate lights originating from emitters placed at the other end of the fiber (1). The device comprises two optical media separated by a filter mirror (8), the emitter-fiber link (2-1) being produced in one of the media (6), the separation and the collection by the receivers (3, 4) being produced in the other of the media (7). The invention applies to telecommunications using optical fibers.

8 Claims, 3 Drawing Figures

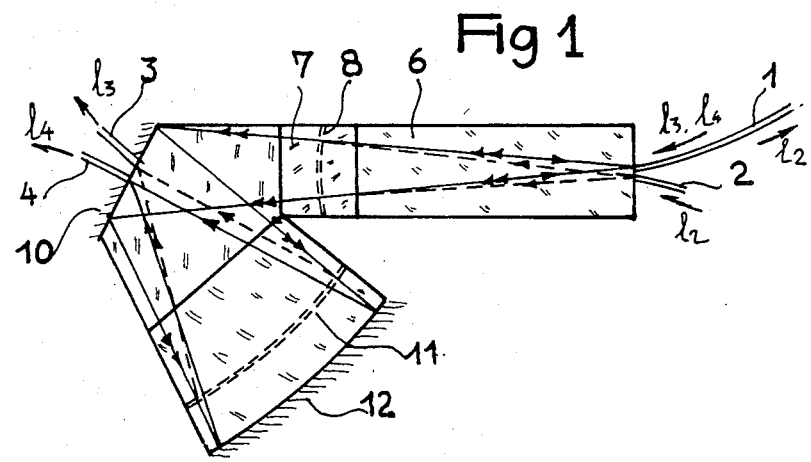
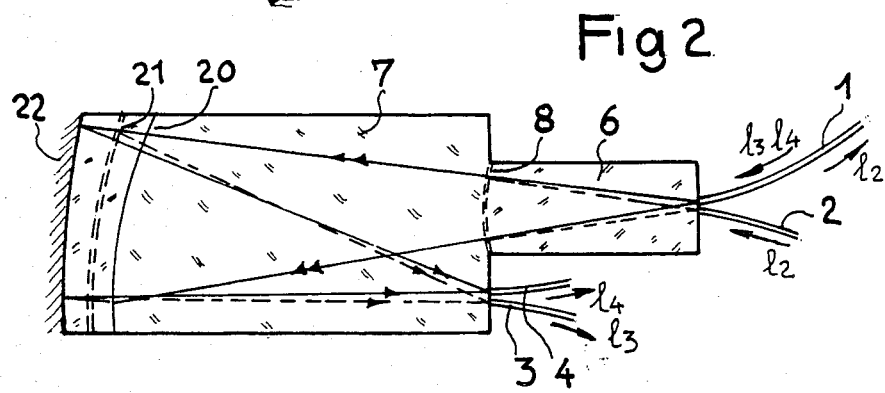
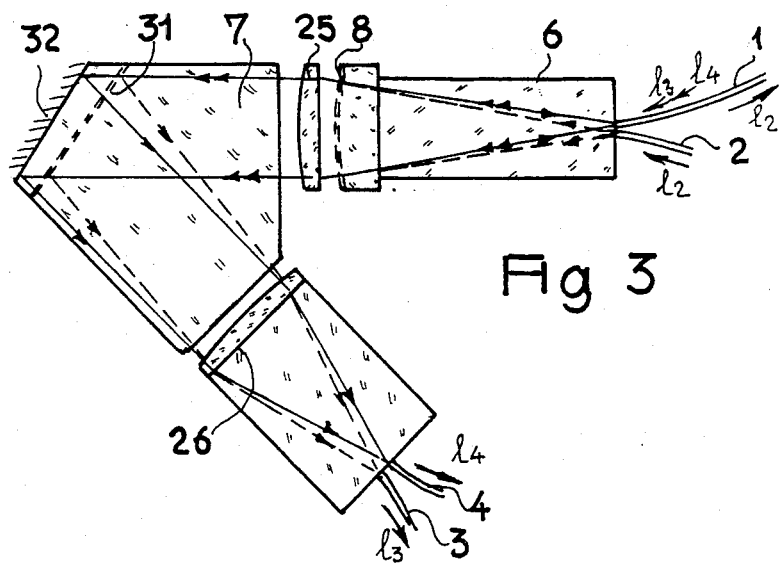

OPTICAL ISOLATION DEVICE FOR MULTIPLEXING OR DEMULTIPLEXING WAVELENGTHS

CROSS-REFERENCE TO RELATED APPLICATIONS

This application is a continuation-in-part of simultaneously filed U.S. patent application Ser. No. 514,386, filed 7/15/83 of Laude et al entitled Compact Wavelength Multiplexer-Demultiplexer With Variable Filtration and related to U.S. Ser. No. 452,481 entitled Wavelength Selector filed Dec. 23, 1982 of Flamand, Gacoin Laude, which, in turn, is a continuation-in-part of U.S. Ser. No. 247,440 entitled Monochromator filed Mar. 25, 1981 but now abandoned of J. P. Laude, the inventor herein, the disclosures of which applications are hereby incorporated herein by reference.

FIELD OF THE INVENTION

The present invention relates to an optical isolation device for multiplexing or demultiplexing wavelengths in an optical transmission fiber, the device being more particularly intended to form an end component in an optical fiber telecommunication system.

BACKGROUND OF THE INVENTION

In such a system, each information is emitted in the form of light which is modulated and then introduced at the end of an optical transmission fiber and is then collected at its other end to be picked up by a receiver which reconstitutes the information. In this context, problems of aberrations are encountered mainly in introducing the light from the emitter into the fiber because, for good transmission performance, use is made most frequently of fibers whose core diameter is of the order of 5 to 50 microns; all the aberrations which lead to an image of the emitter of a greater surface area than that of the fiber core being formed on the input face of the fiber entail thereby a loss of light and a significant cause of weakening of the signal collected at the other end.

Moreover, the optical fiber telecommunication systems must usually be provided for the transmission of information in both directions. The end components therefore serve both for introducing into the fiber at least one signal from at least one emitter placed at the same end of the fiber and for extracting and separating the signals from the emitters placed at the other end. This produces some "diaphony" because stray optical signals produced in the component by the powerful light from nearby emitters can travel through the component as far as the receivers. These receivers are intended to operate at very weak optical levels because the signals which they usually receive are very attenuated by a long distance in the transmission fiber and are consequently very sensitive to any stray light. The stray light originating from the emitter and likely to reach the receivers abnormally can result, for example, from a very slight reflection on the input face of the fiber or from a return through this fiber of a reflection occurring further down the line; it can also originate from general diffusion in the optical medium as a result of imperceptible defects of homogeneity or isotropy of this medium.

For high efficiency, an end component must therefore at the same time allow the full transmission of the light from each emitter to the fiber, and avoid any stray deflection of this light toward the receivers which should collect only the light from the emitters at the other end of the fiber.

SUMMARY OF THE INVENTION

The invention which allows this objective to be attained relates therefore to an optical isolation device for multiplexing or demultiplexing wavelengths in an optical transmission fiber, which is intended to be used at an end of the fiber to introduce therein a light from an emitter and to extract therefrom and to separate, toward at least one receiver, at least one light from an emitter placed at the other end of the transmission fiber.

According to the invention, the device comprises two optical media separated by a filter mirror with multidielectric layers, the emitter-fiber link being produced in one of the media while the separation toward the various receivers is produced in the other.

When the invention is applied to the case where the end of the transmission fiber and the end of the fiber linking with the emitter are arranged at the end of a first block of transparent material forming the first optical medium, in conjugate positions near the center of curvature of a first selective concave mirror with multidielectric layers which forms the other end of the first block, so as to produce a stigmatic coupling of the fiber of the emitter to the transmission fiber, the invention is such that the first selective concave mirror is selected so as to be reflective for at least the emitter wavelengths and to allow the passage of wavelengths originating from the emitters placed at the other end of the transmission fiber, and that the second optical medium consists of a second transparent block acting as a prism and comprising simultaneously means for deflecting the beam which has crossed the first selective mirror, means for separating the various wavelengths of which it consists, and means for focusing the separated beams towards the receivers or fibers linking with these receivers.

According to one embodiment, the means for separating the wavelengths originating from the transmission fiber and for focusing toward the receiver fibers consist of concave mirrors which are selective for each wavelength band to be separated and arranged in series with their axes slightly offset angularly, the receiver fibers being arranged at the conjugate points of the end of the transmission fiber relative to the successive selective mirrors, and the means of deflection consist of a planar reflecting system formed on a face of a second prismatic block, the ends of the receiver fibers being arranged in a non-reflecting central zone reserved on this planar reflecting system.

According to another embodiment, the means for deviation consist of a concave refraction surface arranged in front of the concave separation mirrors, the ends of the receiver fibers being arranged near the center of the refraction surface and the concave separation mirrors arranged so as to focus the refracted beam thereon.

BRIEF DESCRIPTION OF THE DRAWINGS

The invention will be better understood with reference to particular embodiments given by way of example and shown by the attached drawings, which are all simplified optical diagrams.

FIGS. 1 and 2 show configurations in which the separation of the various received wavelengths and their focusing toward the respective receiver fibers is obtained by means of selective concave mirrors. In the device of FIG. 1 the deflection of the beam from the transmission fiber is produced by a plane mirror; in the device of FIG. 2 it is produced by a spherical refraction surface.

FIG. 3 shows a configuration in which the separation of the received wavelengths is produced by selective plane mirrors after collimation in the second medium and before focusing the separated beams.

DETAILED DESCRIPTION

Referring first of all to FIG. 1, the device shown is connected to the transmission fiber 1 both to introduce therein, through the intermediary of the fiber 2, the light signal of wavelength $l_2$ from an emittermodulator (not shown), and to collect from the receiver fibers 3 and 4 the signals carried by lights of wavelengths $l_3$ and $l_4$ from emitters placed at the other end of the fiber 1. The device comprises two transparent media 6 and 7 separated by a selective spherical concave mirror 8, formed by the superposition on the transparent medium of a succession of thin layers, of a thickness of the order of a quarter of the wavelength of the light in question, and alternating in materials of high and low index, such as for example zinc sulfide and cryolite. In this case, the number and the thicknesses of the constituent layers are selected so that the mirror 8 thus formed reflects only one wavelength band containing $l_2$ while remaining transparent without deflection to the other wavelengths, and in particular the wavelengths $l_3$ and $l_4$.

The ends of the fibers 1 and 2 are applied to the block 6 in the immediate vicinity and on either side of the center of curvature of the spherical mirror 8, so that the image of the end of the fiber 2 in the mirror 8 corresponds without appreciable aberration to the end of the fiber 1; the totality of the light $l_2$ from the fiber 2 is therefore also found in the transmission fiber 1.

Moreover, the light beam $l_3 l_4$ from the end of the fiber 1 crosses the mirror 8 without deflection to enter the medium 7 where it meets the plane mirror 10, a small central zone of which is non-reflective. The beam $l_3 l_4$ is therefore substantially reflected toward a selective concave mirror 11 with multidielectric layers and toward another concave mirror 12 which can be totally reflective. The characteristics of the mirror 11 are selected so that it reflects a wavelength band containing $l_3$, while being transparent for the others, including $l_4$. Under these conditions, the light $l_3$ is focused by the mirror 11 on the end of the fiber 3 while the light $l_4$ crosses the mirror 11 to be focused by the mirror 12 on the end of the fiber 4, crossing the mirror 11 again without deflection.

The fibers 3 and 4 are arranged in the central non-reflective zone of the mirror 10.

It will be noted that, in the device just described, all the high intensity light $l_2$ from the nearby emitter is completely isolated in the medium 6 by the mirror 8 which reflects it completely, whether it be the light coming directly from the fiber 2 or the stray light produced by reflection or diffusion. The medium 7 in which the received wavelengths are separated and focused toward the receiver fibers 3 and 4 is therefore completely isolated from the emitter medium 6 and from its stray light, and the lights $l_3$ and $l_4$, even when highly attenuated, will not be perturbed by uncontrolled losses of $l_2$.

If the general arrangement of the system allows it, the detectors for lights $l_3$ and $l_4$ could be arranged directly in the central zone of the mirror 10, in the place of fibers 3 and 4.

The mirror 10 could be replaced by a plane diffraction grating; a light dispersion would then be obtained in the exit plane, with a possibility of demultiplexing a greater number of wavelengths toward a set of detectors.

FIG. 2 shows a general structure which is comparable to that of FIG. 1, but is more compact. This shows again the transmission fiber 1 which must collect the light $l_2$ from a nearby emitter through the link fiber 2. The fiber 1 conducts the lights $l_3$ and $l_4$ which must be collected by the fibers 3 and 4 toward the detectors. As in FIG. 1, the selective concave mirror 8 reflects the light coming from 2 completely toward 1 and completely protects the remainder of the device against any penetration of light $l_2$, whether direct or diffuse.

The beam $l_3 l_4$ from the end of the fiber 1 crosses the mirror 8 without deviation to enter the medium 7 where it meets the spherical surface 20 which separates two media of different indices and which deflects the beam by refraction. The refracted beam, originating from the virtual image of the end of the fiber 1 relative to the surface 20, first meets the selective concave mirror 21 with multidielectric layers which reflects only one wavelength band containing $l_3$ while being transparent for the others, including $l_4$; the latter wavelengths reach the second mirror 22, which can be totally reflective. The mirrors 21 and 22 are selected so as to focus the reflected beams substantially toward the center of the surface 20, so as to avoid a new deflection when it is traversed. The light $l_3$ reflected by 21 reaches the entry of the fiber 3, whilst the light $l_4$ reflected by 22 is collected by the fiber 4. Here again the fibers 3 and 4 could be replaced by the detectors themselves, arranged in the immediate vicinity of the center of the surface 20.

The embodiment shown in FIG. 3 shows again the selective mirror 8 which prevents any propagation of the light $l_2$ toward the zones where the beam $l_3 l_4$ will be deflected and separated after its undeflected crossing of the mirror 8. Here, however, the deflection and the separation of the beam are produced by two plane mirrors 31 and 32 after the beam has been made parallel by the lens 25. The mirror 31 has dielectric layers selected so as to reflect only one wavelength band containing $l_3$ and to allow the passage of $l_4$ which is reflected by the mirror 32 forming a small angle with 31. The two parallel beams which are reflected at a small angle to each other are focused separately by the lens 26 on the ends of the fibers 3 and 4.

I claim:
1. A multiplexer-demultiplexer comprising:
   (a) A solid transparent member, comprising:
      (i) an input end face area;
      (ii) a focusing deflector end face area, said deflector end face area having an orientation parallel to a plane, said deflector end face area having a major axis substantially perpendicular to said plane, said deflector end face area being positioned, configured and dimensioned to receive rays of light of a first wavelength entering from said input end face area at an angle with respect to said major axis and deflect said rays at an angle with respect to said major axis; and
      (iii) an output end face area, positioned and dimensioned to receive and transmit rays of light of said first wavelength deflected by said deflector end face area;

(b) input means positioned at a first point on said input end face area for coupling light of said first wavelength into said transparent member and directing said light toward said deflector end face area, said first point being on a first plane perpendicular to said major axis wherein said input means comprises a first fiber optic member with an input/output face;

(c) output means positioned at a second point on said output end face area, said second point being on a second plane perpendicular to said major axis, said second plane being substantially displaced from said first plane, for receiving light of said first wavelength deflected by said deflector end face area, said first and second points corresponding to conjugate object-image points;

(d) first color responsive focusing means positioned in said solid transparent member between said input means and said deflector end face area, for receiving light of a second wavelength which is emitted by a source positioned at a third point on said input end face area and displaced from said first fiber optic member and imaging such emitted light at the input/output face of said first fiber optic member, said first color responsive focusing means passing other wavelengths of light including said first wavelength, said first and third points corresponding to conjugate object-image points for light of said second wavelength; and (e) a second fiber optic member for emitting light of said second wavelength positioned at said third point.

2. A multiplexer-demultiplexer as in claim 1, further comprising second color responsive focusing means disposed between said deflector end face area and said output end face area, said color responsive focusing means reflecting light of a third wavelength and transmitting light of said first wavelength, said second color responsive focusing means reflecting and imaging light of said third wavelength, emitted by said input means, toward said output end face area and wherein, said output means comprises first and second fiber optic members positioned to receive light of said first and third wavelengths.

3. A multiplexer-demultiplexer, as in claim 1, wherein, said input means further comprises a separate transparent block interposed between said first and second fiber optic members and said input end face area.

4. A multiplexer-demultiplexer as in claim 3, wherein said input means further comprises an air space and focusing optics disposed between said transparent block and said input end face area.

5. A multiplexer-demultiplexer, comprising:
(a) a solid transparent member, comprising:
  (i) an input end face area;
  (ii) a deflector end face area, said deflector end face area substantially parallel to a plane, said deflector end face area having a major axis substantially perpendicular to said plane, said deflector end face area being positioned, configured and dimensioned to receive rays of light of a first wavelength entering from said input end face area at an angle with respect to said major axis and deflect said rays at an angle with respect to said major axis; and
  (iii) a terminal end face focusing area, positioned and dimensioned to receive rays of light of said first wavelength deflected by said deflector end face area and reflect said rays toward said deflector end face area;

(b) input means positioned at a first point on said input end face area for coupling light of said first wavelength into said transparent member and toward said deflector end face area, said first point contained in a first plane; and (c) output means positioned on said deflector end face area at a second point and contained in a second plane, said second plane being substantially displaced from said first plane for receiving light of said first wavelength reflected by said terminal end face area.

6. A multiplexer-demultiplexer as in claim 5, further comprising color responsive focusing means disposed between said deflector end face area and said terminal end face focusing area, said color responsive focusing means reflecting light of a second wavelength and transmitting light of said first wavelength, said second color responsive focusing means reflecting and imaging light of said second wavelength, emitted by said input means, toward said deflector end face area and wherein, said output means comprises first and second fiber optic members positioned at the conjugate object-image points to receive light of said first and second wavelengths.

7. An optical isolation device for multiplexing or demultiplexing wavelengths in an optical transmission fiber (1), one end of said fiber having introduced therein, from an input fiber (2), light and to to extract therefrom and to separate, toward at least one receiver, at least one light communicating with the other end of the transmission fiber, said device comprising first and second optical media (6, 7) separated by a first selective spherical concave mirror (8) with multidielectric layers, a link between the input and transmission fibers being produced in said first (6) of said media while the separation toward said at least one receiver is produced in said second (7) of said media, the end of said input fiber (2) being arranged at one end of said first optical media which comprises a first block (6) of transparent material, in conjugate position to said transmission fiber near the center of curvature of said first selective concave mirror (8) disposed on the other end of said first block, so as to produce a stigmatic coupling of said input fiber (2) to said transmission fiber (1), said first selective concave mirror (8) being reflective for at least a first range of wavelengths and allowing the passage of an other range of wavelengths coming from said transmission fiber (1), and wherein said second optical medium (7) comprises a second transparent block comprising means for simultaneously deflecting light which has crossed said first selective mirror, for separating the various wavelengths of which said range consists, and for focusing the separated beams toward receiver fibers linking with said at least one receiver, said means for separating the wavelengths originating from said transmission fiber and for focusing toward said receiver fibers consisting of concave mirrors which are selective for each wavelength band to be separated and are arranged in series with their axes offset at a slight angle to one another, said receiver fibers (3, 4) being arranged at conjugate points of the end of said transmission fiber (1) relative to successive ones of said selective mirrors arranged in series, said deflecting means consisting of a planar reflecting system (10) formed on a face of said second block (7), the ends of said receiver fibers (3, 4) being arranged in a non-reflecting central zone of said planar reflecting system (10), said planar reflecting system (10) being a plane mirror.

8. An optical isolation device for multiplexing or demultiplexing wavelengths in an optical transmission fiber (1), one end of said fiber having introduced therein, from an input fiber (2), light and to to extract therefrom and to separate, toward at least one receiver, at least one light communicating with the other end of the transmission fiber, said device comprising first and second optical media (6, 7) separated by a first selective spherical concave mirror (8) with multidielectric layers, a link between the input transmission fibers being produced in said first (6) of said media while the separation toward said at least one receiver is produced in said second (7) of said media, the end of said input fiber (2) being arranged at one end of said first optical media which comprises a first block (6) of transparent material, in conjugate position to said transmission fiber near the center of curvature of said first selective concave mirror (8) disposed on the other end of said first block, so as to produce a stigmatic coupling of said input fiber (2) to said transmission fiber (1), said first selective concave mirror (8) being selected so as to be reflective for at least a first range of wavelengths and to allow the passage of an other range of wavelengths coming from said transmission fiber (1), and wherein said second optical medium (7) comprises a second transparent block comprising means for simultaneously deflecting light which has crossed said first selective mirror, for separating the various wavelengths of which it consists, and for focusing the separated beams toward receiver fibers linking with said at least one receiver, said means for separating the wavelengths originating from said transmission fiber and for focusing toward said receiver fibers consisting of concave mirrors which are selective for each wavelength band to be separated and are arranged in series with their axes offset at a slight angle to one another, said receiver fibers (3, 4) being arranged at conjugate points of the end of said transmission fiber (1) relative to successive ones of said selective mirrors arranged in series, said deflecting means consisting of a planar reflecting system (10) formed on a face of said second block (7), the ends of said receiver fibers (3, 4) being arranged in a non-reflecting central zone of said planar reflecting system (10), said planar reflecting system (10) being a plane diffraction grating.

* * * * *